United States Patent [19]

Henning

[11] 3,887,023
[45] June 3, 1975

[54] SNOWMOBILE REAR DRIVE CONSTRUCTION

[76] Inventor: Carl P. Henning, 1231 Stellma La., Rochester, Mich. 48063

[22] Filed: Feb. 27, 1973

[21] Appl. No.: 336,250

[52] U.S. Cl. .............................. 180/5 R; 180/9.54
[51] Int. Cl. .......................................... B62m 27/02
[58] Field of Search .................... 180/5 R, 9.5, 9.54

[56] References Cited
UNITED STATES PATENTS

| | | | |
|---|---|---|---|
| 1,379,323 | 5/1921 | Turnbull | 180/9.54 |
| 1,746,001 | 2/1930 | Leake | 180/9.54 |
| 3,412,821 | 11/1968 | Humphrey | 180/5 R |
| 3,446,303 | 5/1969 | Trapp | 180/9.5 |
| 3,637,035 | 1/1972 | Washburn | 180/5 R |
| 3,664,446 | 5/1972 | Burtis | 180/5 R |
| 3,739,867 | 6/1973 | Drawe | 180/5 R |
| 3,766,999 | 10/1973 | Berguis | 180/5 R |

*Primary Examiner*—Philip Goodman
*Assistant Examiner*—John A. Carroll

[57] ABSTRACT

A dual drive track structure is provided with a medial support plate member intermediate a pair of pivoted endless drive tracks, an equalizing bar member being pivotable upon the medial support plate member to balance and stabilize the drive tracks into substantially parallel attitude when the snowmobile is turned upon a ground plane snow terrain, both of the rear drive tracks having at least a fair portion of their ground plane engaging surfaces in land contact to more effectively drive the snowmobile, particularly in sharp turning. The pivoting dual drive track structure is pivotally supported from and upon the front driving cross shaft and secured against lateral displacement by guide means slidable upon and engaged with the medial support plate member.

17 Claims, 9 Drawing Figures

PATENTED JUN 3 1975  3,887,023

SHEET 1

SNOWMOBILE REAR DRIVE CONSTRUCTION

BRIEF DESCRIPTION OF THE INVENTION

The invention relates to a snowmobile drive track structure and particularly involves a dual endless drive track construction in which both of the drive tracks are driven by sprockets secured to and mounted upon a front end engine driven cross shaft. The drive tracks are pivotally supported by members pivotable upon the front end driven cross shaft, and by a medial support plate member intermediate the dual drive tracks and fixedly secured to the snowmobile framing structure. Slide guide means engaged upon the medial support plate member are provided for the pivoting support structures of each drive track to secure them against lateral displacement and to maintain them in parallel alignment at their forward ends with their driving sprockets. Each of the drive tracks is of the endless belt variety provided with a plurality of cleats secured transversely across and to a pair of parallel endless track webs. Resilient track stabilizing means is secured to the slide guide means for balancing and biasing each of the dual drive tracks toward a substantially balanced parallel aligned relationship. An equalizing bar member pivotable upon the medial support plate member is engaged with each of the track supporting structures to stabilize and balance the drive tracks to a substantially parallel attitude in their driving turning function and operation.

BACKGROUND OF THE INVENTION

Heretofore, snowmobile dual drive tracks have been provided with fairly complicated and complex means for maintaining ground plane contact of a fair portion of the drive tracks during turning operations. Burtis et al. U.S. Pat. No. 3,664,446 issued May 23, 1972, particularly discloses dual drive tracks having arcuate ground plane engaging track surfaces with an intermediate support for the drive track structures, including a pivoting framing structure engaged by a ball and socket joint central of a transverse framing member. Dual drive track structures such as are disclosed in Humphrey, Pat. No. 3,412,821 issued Nov. 26, 1968, and Washburn, Pat. No. 3,637,035 issued Jan. 25, 1972, fail to provide the stability and security required for dual drive tracks in their tilting ground plane snow terrain contacts when making sharp turns.

The snowmobile framing structure is tilted by the snowmobiler by a shift in his weight to one side or the other of the snowmobile with a marked shift in the center of gravity during sharp turning. Such shift in the center of gravity tilts the snowmobile framing so that only a very small part of the dual drive tracks engages the ground plane terrain. When this occurs, the loss of land contact or engagement causes the snowmobile to slide or skid and the sharp turn degenerates into a relatively wide sweeping arc. In racing or other competition, the failure to make and hold sharp turns on snow terrain subjects the snowmobiler to a loss in pace, position and speed. The invention disclosed herein provides for relatively spaced apart dual track contact with the ground plane snow terrain through a structure which substantially stabilizes and equalizes the load and forces applied to the rear drive tracks during sharp turning of the snowmobile, whereby greater control and efficiency are achieved.

It is therefore an object of the invention to provide a dual drive track construction for a snowmobile in which spaced apart areas of ground plane snow terrain contact are made by dual drive track structures which are stabilized and equalized for parallel driving operation. Another object is to provide an equalizing bar engaged with the supporting frames of each of the rear drive track structures which are pivotable from and upon a front end engine driven cross shaft. A further object is to provide slide guide means connected to the supporting frames and slidably engaged with a medial support plate member for and intermediate the dual drive tracks. Still another object is to provide resilient stabilizing means engaged with the slide guide means to dampen the pivoting movement of the drive tracks in turning and to bias them toward and into a relatively stable parallel aligned attitude. A further object is to provide a dual rear drive track construction which is relatively simple and inexpensive, and which permits relatively sharp turning operation of the snowmobile through improved efficient drive track engagement with the ground plane snow terrain.

Various further and more specific objects, features and advantages of the invention will appear from the description given below, taken in connection with the accompanying drawings, illustrating an exemplary embodiment of the invention. Reference is here made to the drawings annexed hereto and forming an integral part of this specification, in which.

Figure 5:
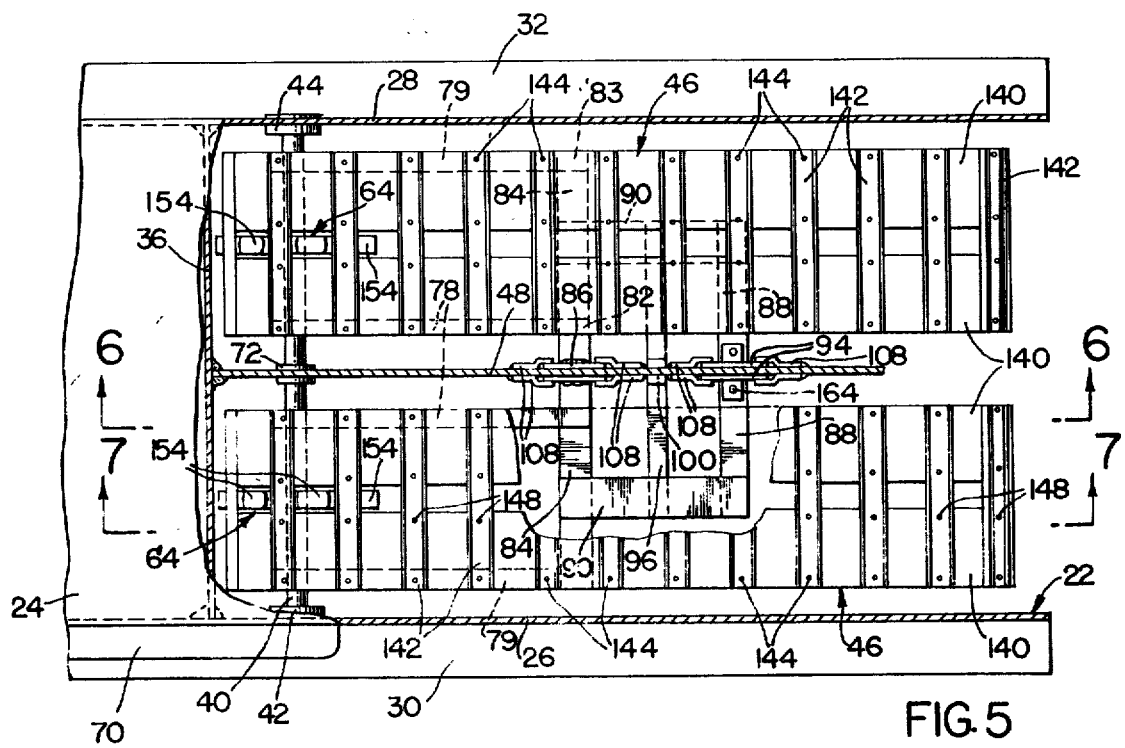
FIG. 5 is a horizontal substantially plan view, partially in section, taken substantially on the line 5—5 of FIG. 2.
Figure 6:
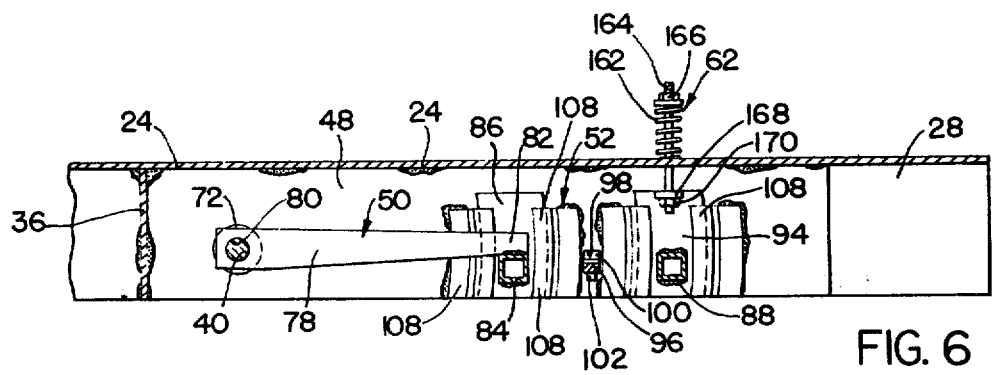
Figure 7:
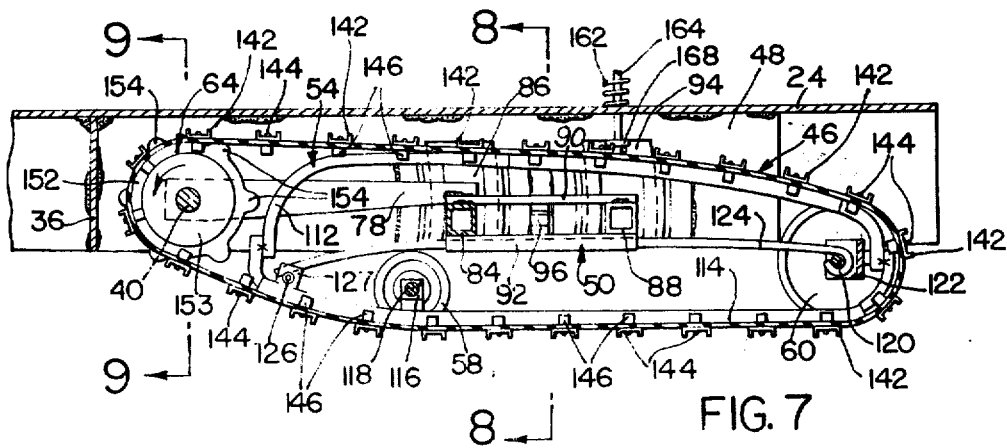

FIGS. 6 and 7 are longitudinally extending vertical sectional views, taken substantially on the lines 6—6 and 7—7 respectively of FIG. 5.

Figure 8:
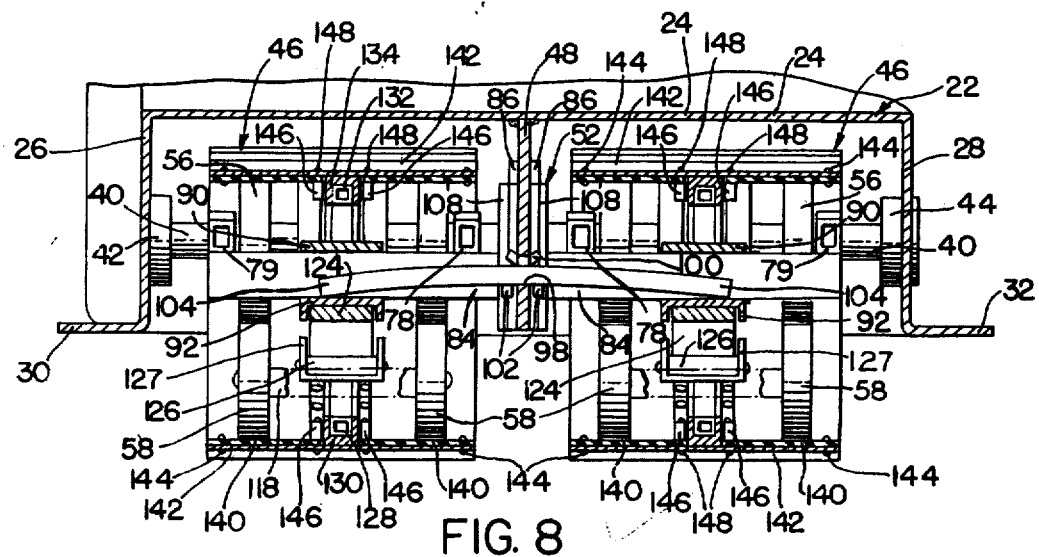
Figure 9:
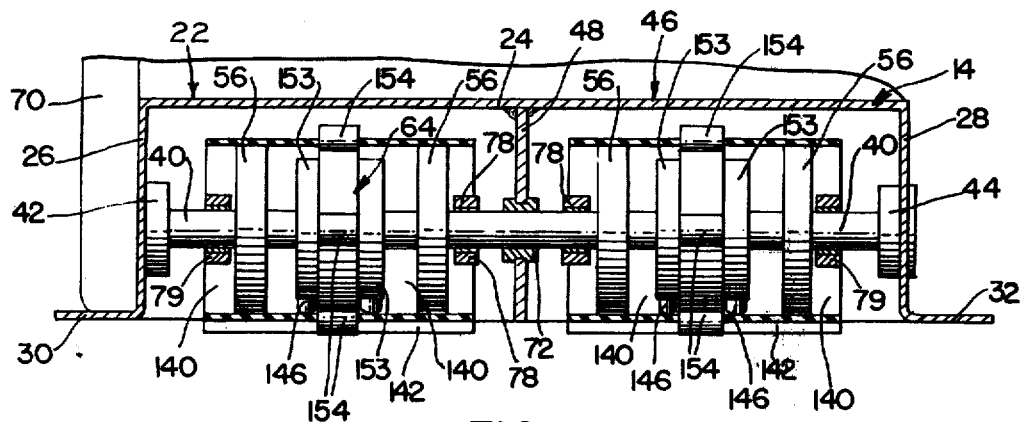

FIGS. 8 and 9 are transverse vertical sectional views, taken substantially on the lines 8—8 and 9—9 of FIG. 7.

As illustrated in the several views of the drawings, the snowmobile 10 comprises the front ski steering portion 12 and the rear snowmobile framing portion 14 pivotally secured together at the front steering and framing members 16 and 18 respectively upon a horizontally pivotable axis and pin not shown but fully described in my co-pending application Ser. No. 336,164, filed Feb. 27, 1973 of even date, entitled "Snowmobile Front Steering Construction." The invention herein disclosed involves the rear dual drive track structure 16 pivotally supported upon the framing 14, as an exemplary embodiment of the invention.

The snowmobile framing structure 14 comprises generally a channel-shaped framing member 22 having a longitudinally extending top plate web portion 24, a pair of substantially coextensive laterally depending leg members 26, 28 connected to each lateral marginal edge of the web portion 24, and optionally, lateral flange members 30, 32 extending outwardly from the lower marginal end portions of the depending legs 26, 28 respectively. The framing member 22 extends substantially from the forward transverse member 18 to the rearward end 34 of the framing structure 14. A forward transverse rib member 36 is secured to the framing member 22 intermediate the legs 26 and 28 to box and reinforce the member 22 for support of the drive track structure 16.

The rear dual drive track structure 16 comprises an engine driven front end cross shaft 40 supported upon the snowmobile framing member 22 between the vertically depending legs 26 and 28 on which the cross shaft is rotatably secured in bearings 42 and 44 respectively, the dual drive tracks 46, 46, the medial support plate member 48 extending longitudinally of the framing member 22 and secured intermediate the drive tracks 46, 46 to the top plate web portion 24 and to the front transverse rib member 36 by welding or other suitable means, a support frame structure 50 for each drive track 46 pivotable about and upon the front end cross shaft 40, slide guide means 52 secured to the pivotable support frame structure 50 and slidable upon and relative to the medial support plate member 48, a guide frame 54 extending longitudinally and medially of and engageable by and within the drive tracks 46, idler bogie wheels 56 rotatably supported upon the cross shaft 40 at the forward end of the drive tracks and therewithin, bogie wheels 58 rotatably supported upon the guide frame 54 intermediate the ends of the drive track 46 and bogie wheels 60 rotatably supported upon the guide frame 54 at the rearward end of the drive tracks and therewithin, a drive track stabilizing and balancing structure 62 supported upon the framing member 22 and secured to the slide guide means 52, and drive sprockets 64 affixed for rotation to the cross shaft 40 and engaged with the drive tracks 46 to rotate them about and upon the bogie wheels 56, 58 and 60 and the guide frame 54.

The cross shaft 40 supported at one end in the bearing 42 secured to the leg 26 has an outboard portion (not shown) which is engaged by a drive chain driven by an engine (not shown) mounted upon the framing structure 14, the drive chain being encompassed within the guard or cover 70 overlying a portion of the frame member leg 26.

The medial support plate member 48, extending rearwardly from the transverse rib member 36, supports the medial bearing 72 for the cross shaft 40 and the slide guide means 52 rearwardly thereof and adjacent the pivoting support frame structure 50 for each of the drive tracks 46, 46.

The frame structures 50, 50 each comprises the pivot bar members 78, 79 provided with openings 80 adjacent their forward ends for free pivoting movement upon and about the cross shaft 40, their rearward end portions 82, 83 respectively being fixedly secured to a forward transverse framing member 84 whose lateral inner end is affixed to the forward slide plate 86, a rearward transverse framing member 88 arranged in parallel with framing member 84 and secured in spaced apart relationship thereto by an upper longitudinally extending plate member 90 and a lower longitudinally extending channel member 92 fixedly attached to the members 84 and 88. The rearward transverse frame member 88 is affixed at its inner end to the rear slide plate 94, the slide plates 86 and 94 rotating in a vertical plane about the horizontal axis of the cross shaft 40 as the track support frame structure 50 pivots on pivoting bar members 78 and 79 about the cross shaft 40.

As shown particularly in FIG. 8, the dual track stabilizing and equalizing bar 96 extends through an opening 98 in the medial support plate member 48 intermediate the transverse frame members 84 and 88 and substantially parallel thereto, the equalizing bar being pivotable upon the medial support plate member 48 under a bearing 100 secured in the opening 98. Pins 102, 102 are affixed to the equalizing bar 96 on its lower side and on either side of the medial support plate member 48 to retain the equalizing bar against undue lateral displacement in its pivoting operation. The ends 104, 104 of the equalizing bar bear upon the web portions of the channel members 92 in each of the track support frame structures 50, 50 to retain and maintain them in a balanced parallel attitude and relationship as the snowmobile is turned to one side or the other by the front steering system 12 and by the shifting center of gravity occasioned through the weight shift of the snowmobiler in turning and steering the snowmobile.

The slide guide means 52 includes the slide plates 86 and 94 fixedly secured to the pivoting track support frame structures 50, 50 and the slide plate guide members 108, 108 on each side of the slide plates and about their edges to retain the slide plates upon and in sliding relationship to the medial support plate member 48 and to retain the drive tracks 46, 46 from lateral displacement during operation of the snowmobile, particularly in turning.

The guide frames 54, 54 for the tracks 46, 46 each comprises track support framing members 112 and 114 secured together at their ends so as to form a generally oval planar frame structure about which the endless drive track 46 will rotate as it is driven by the drive sprockets 64. The guide frame 54 supports a pair of intermediate bogie wheels 58 rotatable upon a shaft 118 secured to a transverse support member 116 affixed to the lower longitudinally extending framing member 114, the perimeters of the bogie wheels 58 engaging the drive track 46 therewithin. The rear bogie wheels 60, 60 are rotatably mounted upon a shaft 120 secured to a transverse support member 122 affixed to the longitudinally extending guide framing member 112 adjacent its rearward end. A spring leaf 124 has its rearward end curled about and pivotably rotatable upon the bogie wheel shaft 120, and extends longitudinally forward under and within the channel member 92, supporting the same and the pivoting track support frame structure 50, to rest upon a forward pin 126 secured in its bracket 127 affixed to the lower framing member 114 adjacent its forward end, so that the spring leaf 124 is free to rest and move upon the pin 126 as the pivoting support frame structure 50 rises and falls in pivoting movement about the cross shaft 40.

As shown particularly in FIG. 8, it will be observed that the upper and lower guide frame members 112 and 114 respectively are made of a square cross-sectional tubular member 128, with an outer overlying channel member 130 for frame member 114, and an inner square tubular member 132 with an outer overlying channel member 134 for the upper frame member 112. The inner square tubular members 128 and 132 are preferably made of steel while the outer overlying channel members 130 and 134 are preferably made of a low friction type of plastic material, such as high density polyethylene, polypropylene, teflon or other suitable plastic materials for the slide guide function associated and in connection with the drive track 46, described hereinafter below.

The drive tracks 46, 46 each comprises a pair of endless relatively resilient flexible webs 140, 140 of a rubber or similar composition material, arranged in parallel and spaced apart from each other a distance sufficient to allow the drive sprocket 64 to freely enter therebetween, a plurality of drive cleats 142 which are illustrated in channel form but may also be made of angles or other suitable configuration whereby the cleats will engage the ground plane snow terrain in positive driving relationship thereto, the cleats being disposed in parallel spaced apart relationship longitudinally of the endless webs 140, 140 transversely thereupon, the cleats being secured to the webs 140, 140 by rivets 144, and the slide guide bearings 146 of a low friction type material secured to the cleats 142 inwardly of the webs 140, 140 by fasteners 148 adjacent the inner edges of the webs 140 and the low friction channel members 130 and 134 overlying the square tubular frame members 128, 132, to guide the track webs 140, 140 and limit their lateral displacement under the forces applied thereto in turning and driving the snowmobile 10.

The drive sprockets 64, 64 each comprises a body portion 152 having boss or hub portions 153, 153 and sprocket teeth 154 about the perimeter of the body portion in spaced apart relationship a distance sufficient to engage each of the cleats 142 in driving relationship as the sprocket rotates with cross shaft 40 to drive the track 46 upon the guide frame 54.

The drive track stabilizing means or device 62 comprises the compression spring 162, the spring post 164 having an upper adjusting nut 166 threadedly engaged thereon to adjust the spring 162 upon the framing top plate web portion 24, the spring post 164 extending through the top plate web portion 24 and the bracket or flange 168 secured to the upper end portion of the slide plate 94, the spring post 164 being adjustably secured to the bracket 168 by the lower fastener nut 170. One such stabilizing device 62 is secured to each of the slide plates 94 on either side of the medial support plate member 48.

Figure 1:
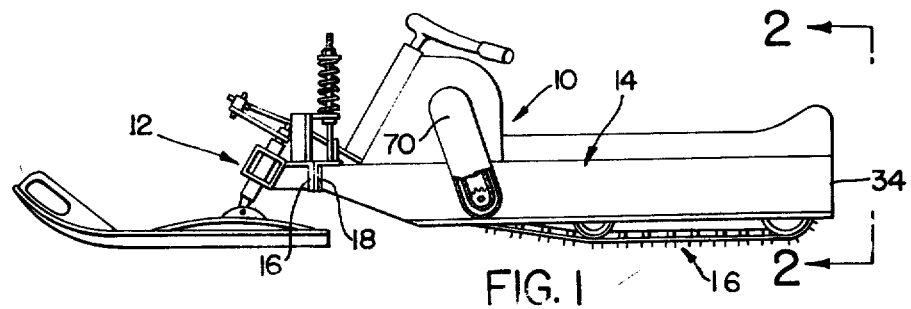
FIG. 1 is a side elevational view of an exemplary embodiment of the invention incorporated into a snowmobile structure.
Figure 2:
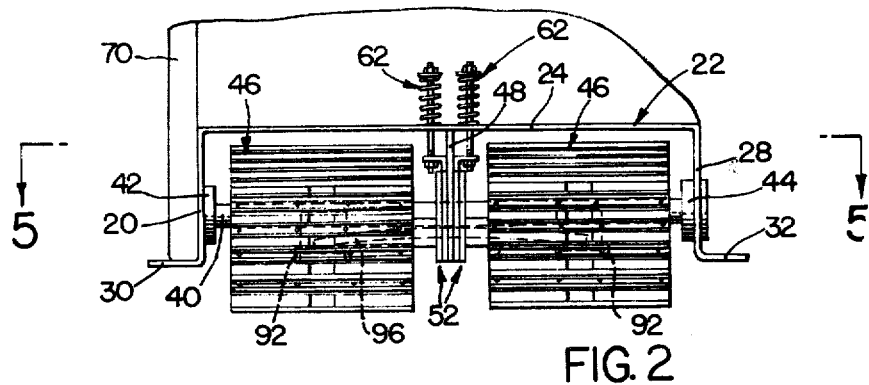
FIG. 2 is a rear elevational view taken substantially on the line 2—2 of FIG. 1.
Figure 3:
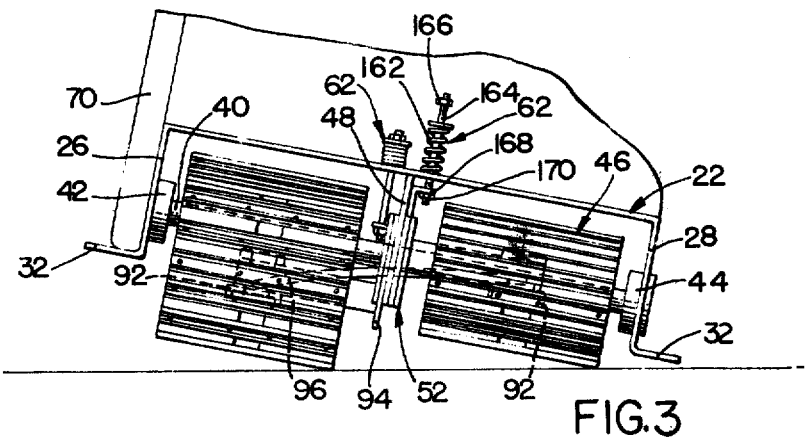
FIGS. 3 and 4 are rear elevational views, similar to that illustrated in FIG. 2, showing the parallel ground plane engaging relationship of the dual drive tracks in making relatively sharp turns of a snowmobile to the right and to the left respectively.
Figure 4:
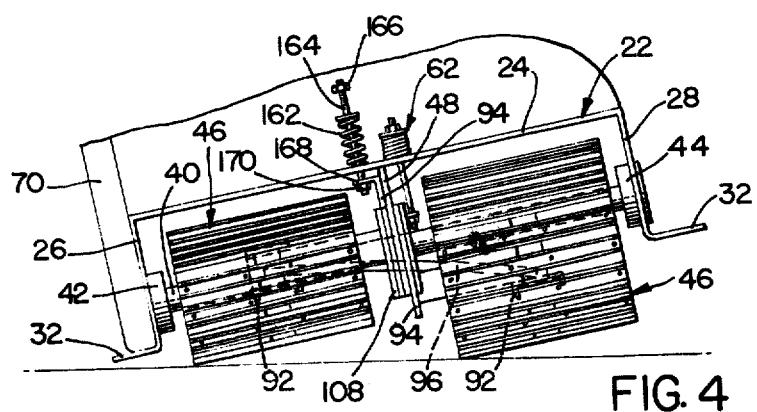

Although FIGS. 3 and 4 illustrate the dual drive tracks 46, 46 as making line contacts with an imaginary ground line, when the snowmobile 10 is tilted in turning to the right and to the left respectively, it will of course be understood by persons skilled in the art to which the invention pertains that the area of land contact is considerably greater. The ground line shown is essentially that of a concrete floor, but the terrain on which the snowmobile normally operates is generally irregular in contour and covered with snow to a depth of several inches in most cases, even when packed for racing and other competitive events. Therefore, the cleats 142 and webs 140 will penetrate into the snow terrain to a depth and extent commensurate with the density of the snow, and the load and forces applied by the snowmobile and its operator in driving and turning the machine.

In operation, the snowmobile 10 is driven by the dual rear drive tracks 46, 46 through an engine and a drive chain connected with the cross shaft 40 within the chain guard 70 to rotate the same and drive the sprockets 64 in a counterclockwise direction as seen in FIG. 7. The sprockets, which rotate within the open spacing between the adjacent endless webs 140, 140, drive the webs and cleats 142 into the ground plane snow terrain so as to engage the same and drive the snowmobile 10 forwardly. The slide guide bearings 146 affixed to the webs 140, 140 on either side of the guide frame members 112 and 114 maintain each track 46 in a substantially true longitudinally extending alignment relative to the longitudinally extending medial support plate member 48 with which it is slidingly associated through the slide plates 86 and 84 engaged by their guide members 108, 108 affixed to the medial support plate member 48. The entire drive track 46 pivots about and from the cross shaft 40 by means of the pivoting bar members 78 and 79 to which the pivoting track support frame structure 50 is fixedly secured. Each stabilizing and dampening device 62, supported upon the snowmobile frame structure 22 at the top plate web portion 24 and being secured to the rear slide plate 94, biases each drive track 46 to a relatively parallel aligned relationship with the other drive track and limits its pivoting movement.

In sharp turning, the equalizing bar 96 bears upon the channel member 92 overlying the spring leaf 124 to maintain each drive track 46 in substantially parallel relationship so that dual areas of snow terrain contact by the drive tracks 46, 46 are maintained at all times during turning of the snowmobile. In such turning, a slight twisting or bending moment about the sprocket 64 may occur to a degree because of the longitudinal extent of the drive tracks rearwardly to and about their rear bogie wheels 60. Although such twisting motion of the drive tracks 46, 46 is not illustrated in FIGS. 3 and 4, it will be understood by persons skilled in the art to which the invention pertains that relative twisting about the plane of the drive sprocket 64 may well occur under the loads and forces applied to the drive tracks during forward turning operations of the snowmobile.

The cross shaft 40, medial support plate member 48, pivoting track support frame structure 50, slide guide means 52, guide frames 54, track stabilizing means 62, drive sprockets 64, and equalizing bar 96 are made primarily of steel and steel components, adapted to be welded or otherwise suitably connected, affixed or attached, to support or function under the loads and forces applied thereto in the operation of the snowmobile 10. Inasmuch as the improvements herein disclosed are primarily directed to more positive engagement of the drive tracks 46, 46 with the ground plane snow terrain in relatively sharp turning, selected appropriate steel and structural materials having adequate load-bearing sections are to be used. Resilient flexible webs 140, 140 are preferably made of a rubber or equivalent composition material, as is well known in the art. The selection of suitable materials for other components of the disclosed construction is well within the knowledge of persons skilled in the art to which the invention pertains.

Although a particular exemplary embodiment of the invention has been disclosed herein for purposes of explanation, further modifications or variations thereof, after study of this specification, will or may become apparent to those skilled in the art to which the invention pertains. Reference should be had to the appended claims in determining the scope of the invention.

I claim:

1. In a snowmobile rear drive construction, the combination comprising a framing structure having a top plate web portion, depending leg members at each lateral side thereof and a forward transverse rib member conjoined to each other, dual drive tracks, a longitudinally extending, vertically disposed, substantially planar medial support plate member affixed to said top plate web portion and said forward transverse rib member and disposed between said dual drive tracks, an engine driven front end cross shaft rotatably mounted upon said framing structure, a drive track support frame structure for each said drive tracks pivotally mounted upon said cross shaft and slidingly engaged with said medial support, slide guide means affixed to each said drive track support frame structure and slidable upon and relative to said medial support, a longitudinally extending guide frame for each said drive tracks secured to each said drive track support frame structure, a drive sprocket for each said drive tracks fixedly mounted on said cross shaft and rotatable therewith, and in engagement with said drive track to drive the same upon and about said guide frame, and an equalizing member pivotable and retained upon said medial support plate member intermediate its ends, extending transversely and to either side thereof, disposed for bearing engagement upon each said drive track support frame structure to maintain said drive tracks in substantially parallel ground plane terrain contact.

2. The construction defined in claim 1, wherein said cross shaft is supported for rotation at its outer ends upon said depending lateral leg members, and adjacent its medial portion upon said medial support plate member.

3. The construction defined in claim 1, wherein said medial support plate member is disposed substantially parallel to and central between said depending lateral leg members.

4. The construction defined in claim 1, wherein said pivoting drive track support frame structure comprises
   a bar member pivotally supported for rotation upon said cross shaft and extending rearwardly therefrom, and transversely extending framing members fixedly secured in longitudinally spaced apart relationship by framing means to said pivotable bar member.

5. The construction defined in claim 4, wherein said pivoting drive track support frame structure framing means comprises
   an upper plate member and a lower depending channel member affixed to said transverse framing members to secure them in longitudinally spaced apart relationship.

6. The construction defined in claim 5, wherein said pivoting drive track support structure further comprises
   a longitudinally extending supporting spring leaf member movably secured to and upon said guide frame,
   said lower depending channel member resting movably upon and engaged with said spring leaf member.

7. The construction defined in claim 4, wherein said slide guide means comprises
   at least one slidable plate member disposed adjacent said medial support plate member and secured to said drive track support frame structure, and slide plate guide members for each said slidable plate members affixed to said medial support plate member, keeping said slidable plate members relatively closely adjacent said medial support plate member,
   said slidable plate members being pivotable about the axis of said cross shaft.

8. The construction defined in claim 7, wherein the inner ends of said transverse frame members are fixedly secured to said slidable plate members.

9. The construction defined in claim 7, wherein each said slidable plate members are arcuately shaped for rotatable travel about said cross shaft axis and within the effective compass of said guide members.

10. The construction defined in claim 1, wherein said guide frame comprises
    a pair of framing members disposed in a substantially vertical plane, their end portions being fixedly secured together to form an endless longitudinally extending support for said drive track, and a layer of an overlying relatively low friction material secured to selected exposed portions of said pair of framing members.

11. The construction defined in claim 4, wherein said equalizing member is freely pivotable in an opening in and upon said medial support plate member,
    said equalizing member extending transversely through said opening and to either side thereof,
    said equalizing member being disposed in substantially parallel relationship to said drive track support frame structure framing members.

12. The construction defined in claim 11, wherein said equalizing member is disposed for bearing relationship to and upon at least one said framing member of each said drive track support frame structure.

13. The construction defined in claim 11, wherein said equalizing member is disposed for bearing relationship to and upon at least a portion of said framing means of each said drive track support frame structure.

14. The construction defined in claim 11, wherein said equalizing member is provided with detent means on either side of said medial support plate member to retain said equalizing member thereon in its pivoting and bearing functions, and in substantially a balanced posture.

15. The construction defined in claim 12, wherein said detent means comprises a projecting pin on either side of and engageable with said medial support plate member to limit longitudinal displacement of said equalizing member.

16. The construction defined in claim 5, wherein said equalizing member is pivotable in an opening in and upon said medial support plate member,
    said equalizing member extending transversely through said opening and to either side thereof,
    said equalizing member being disposed in substantially parallel relationship to said drive track support frame structure framing members, said equalizing member being disposed for bearing relationship to and upon said channel member of each said drive track support frame structure.

17. The construction defined in claim 8, wherein said combination further comprises
 a drive track stabilizing device for each said drive tracks comprising
  a compression spring disposed and bearing upon said framing structure,
  a spring support secured to at least one said slidable plate member,
  and means to adjust the operative extent of said spring for limiting the vertical travel of said drive track support frame structure.

* * * * *